(12) United States Patent
Brezni et al.

(10) Patent No.: US 8,232,500 B2
(45) Date of Patent: Jul. 31, 2012

(54) PLASMA TORCH ASSEMBLY

(75) Inventors: Danny Brezni, Ascot Vale (AU); Jost Eberhard Kaiser, Kew (AU); Bobby Brezni, Maidstone (AU); David Sultana, Craigieburn (AU)

(73) Assignee: Glass Expansion Pty Ltd., Victoria (AU)

( * ) Notice: Subject to any disclaimer, the term of this patent is extended or adjusted under 35 U.S.C. 154(b) by 0 days.

(21) Appl. No.: 12/942,314

(22) Filed: Nov. 9, 2010

(65) Prior Publication Data

US 2011/0056918 A1    Mar. 10, 2011

Related U.S. Application Data

(63) Continuation of application No. 11/668,153, filed on Jan. 29, 2007, now Pat. No. 7,847,210.

(30) Foreign Application Priority Data

Jan. 31, 2006  (AU) ................ 2006900447
Oct. 3, 2006   (AU) ................ 2006905452

(51) Int. Cl.
    *B23K 10/00*     (2006.01)
(52) U.S. Cl. ......... 219/121.48; 219/121.49; 219/121.51; 219/121.36; 219/121.52
(58) Field of Classification Search ............ 219/121.52, 219/121.48, 121.51, 121.54, 75, 121.59; 313/231.31, 231.41; 315/111.51, 111.21; 356/316

See application file for complete search history.

(56) References Cited

U.S. PATENT DOCUMENTS

| | | | |
|---|---|---|---|
| 3,797,956 A * | 3/1974 | Bayer et al. | 408/35 |
| 4,266,113 A * | 5/1981 | Denton et al. | 219/121.51 |
| 4,482,246 A * | 11/1984 | Meyer et al. | 356/316 |
| 4,739,147 A | 4/1988 | Meyer et al. | |
| 4,833,294 A | 5/1989 | Montaser et al. | |
| 5,186,621 A | 2/1993 | Pennington | |
| 6,424,082 B1 * | 7/2002 | Hackett et al. | 313/231.31 |
| 7,112,759 B1 * | 9/2006 | Severance, Jr. | 219/121.52 |

OTHER PUBLICATIONS

T. Bradford et al., "Inductively Coupled Plasma (ICP)", http://www.cee.vt.edu/environmental/teach/smprimer/icp/icp.html (7 pages), Dec. 22, 1997.

* cited by examiner

*Primary Examiner* — Henry Yuen
*Assistant Examiner* — Jianying Atkisson
(74) *Attorney, Agent, or Firm* — Rissman Hendricks & Oliverio LLP

(57) ABSTRACT

This application relates to a plasma torch assembly comprising
  a plurality of tubes;
  a collar integral with at least one tube comprising a first abutment surface;
  a base for holding the tubes during operation of the torch comprising a portion for receiving the collar and a second abutment; and
  co-operating interlocking portions for removably urging the first and second abutment surfaces together by relative rotation of the interlocking portions wherein the first and second abutment surfaces comprise a complimentary taper for aligning the collar in concentric formation with at least one other tube on the base by co-operation of the interlocking portions.

14 Claims, 14 Drawing Sheets

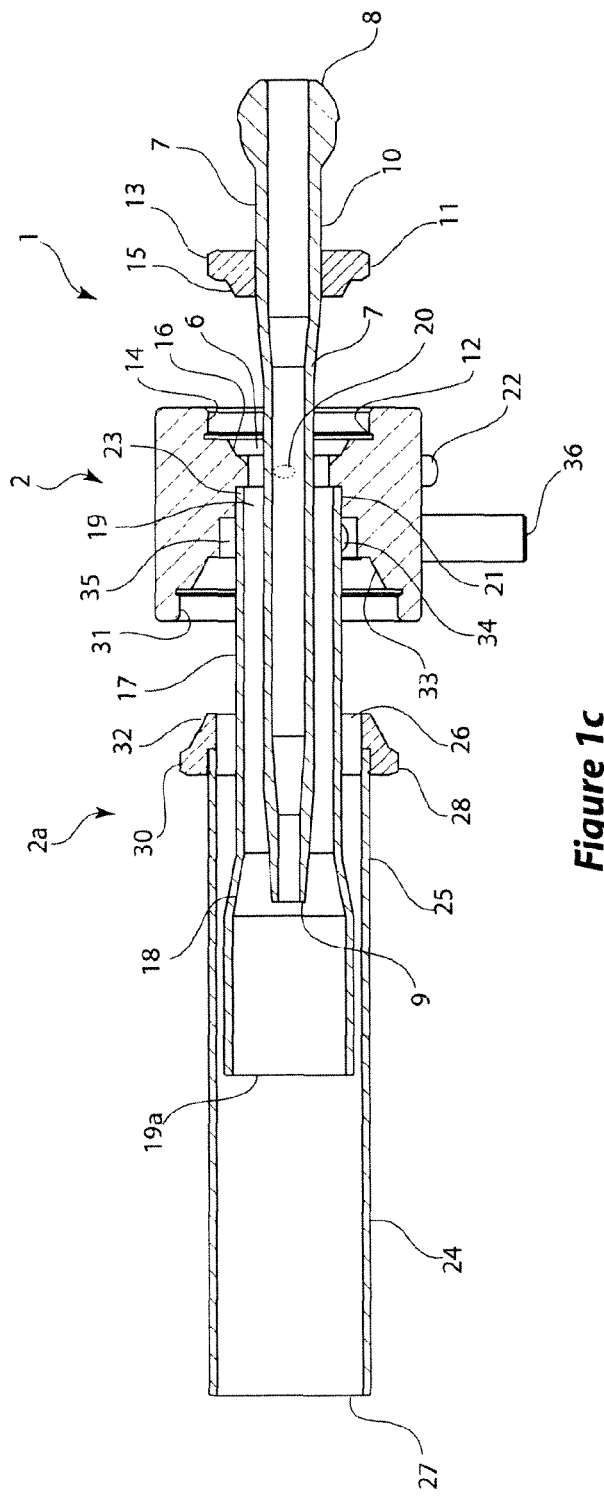
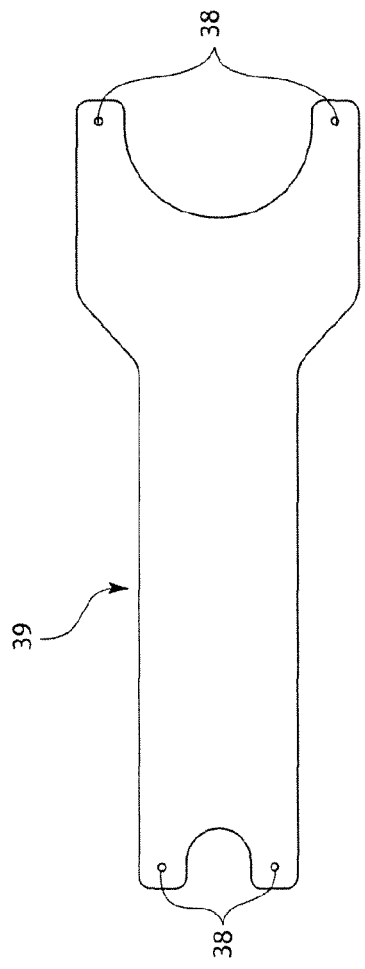
*Figure 1c*
*Figure 1d*

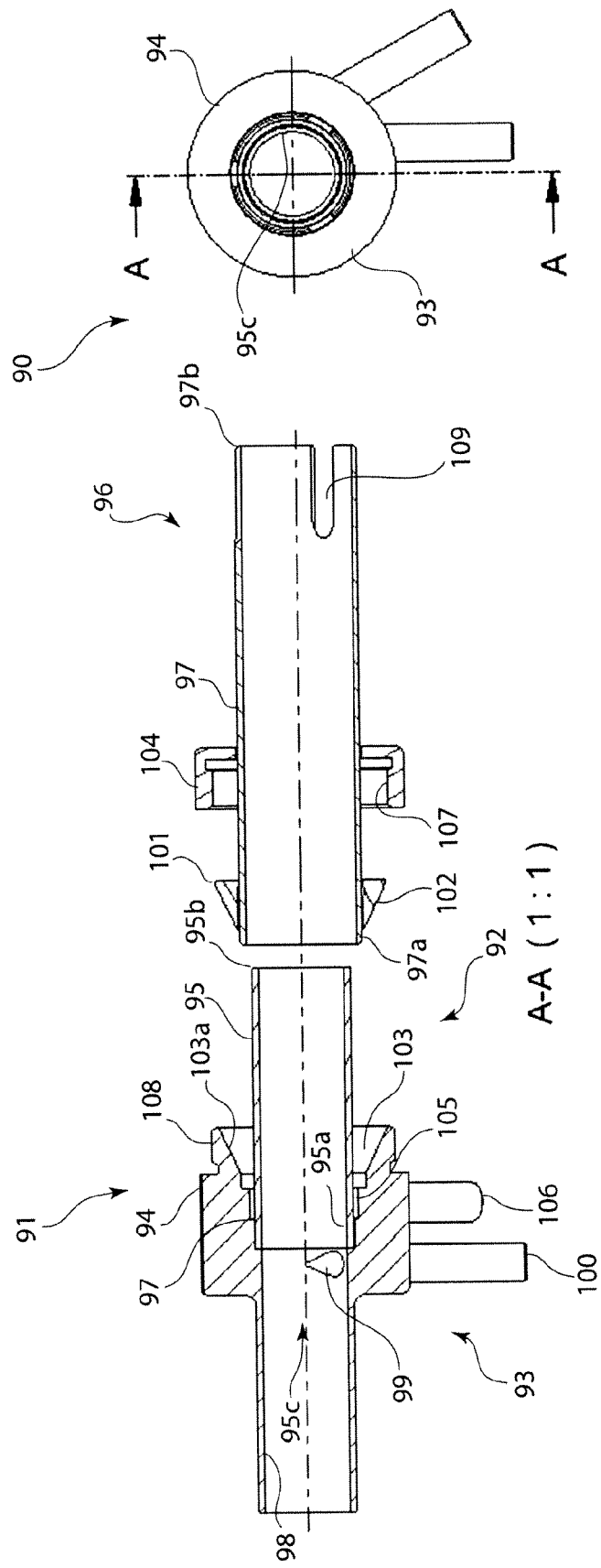

PLASMA TORCH ASSEMBLY

RELATED APPLICATIONS

This application is a continuation of U.S. Ser. No. 11/668,153 filed 29 Jan. 2007 and claims priority to Australian Provisional Patent Application No. 2006900447 filed 31 Jan. 2006 and Australian Provisional Patent Application No. 2006905452 filed 3 Oct. 2006, the contents of which are incorporated herein in their entirety.

FIELD

This invention relates to the field of plasma torches, and particularly relates to the field of gas and aerosol handling infrastructure in plasma torches. More particularly this invention relates to demountable plasma torches, wherein the gas and aerosol handling infrastructure can readily be dis-assembled for maintenance and replacement of components. This application claims priority from Australian Provisional Applications 2006900447 (Jan. 31, 2006) and 2006905452 (Oct. 3, 2006) the contents of which are herein incorporated by reference.

BACKGROUND

Plasma torches are an important component of inductively coupled plasma devices which are used in elemental analysis. Inductively coupled Plasma (ICP) Torches commonly include three concentric tubes including an inner sample tube for delivering an aerosol sample to the plasma, the middle tube (frequently flared) for delivering the plasma gas, and the outer tube for delivering a coolant gas.

The three tubes are typically in concentric alignment over a length of 5-20 centimeters, and the required tolerance is very fine. For example the distance between the flared end-section of the plasma tube and the surrounding coolant tube is of the order of 0.4 mm, and the positioning of the plasma tube must be precise preferably to within 50 micrometers. As a result ICP torches have conventionally been formed using three tubes fused at one end to fix the tolerances required for consistent operation.

A torch in which the tubes are fused is difficult to clean or repair, for example when the sample tube is contaminated or when the coolant tube undergoes melt-down.

Attempts have been made to produce demountable torches by using a base structure in which the tubes are removably mounted. The demountable base assembly must however anchor all the tubes at a distance of at least 5 cm from the point of greatest sensitivity (ie the place where the flared end of the plasma tube is 0.4 mm from the coolant tube. Frequently the insertion of a new tube in a demountable base assembly is labour intensive and involves such tasks as performing trial rotations of one or more tubes to avoid pinch points in the gas flow.

U.S. Pat. No. 4,833,294 (A. Montaser et al. filed Feb. 12, 1998) describes a plasma torch including a base member, a plasma tube and a threaded insert member within the plasma tube for directing the plasma gas in a tangential flow pattern, and for sample introduction. This design comprises only one tubular member inside another, however high precision alignment is still necessary, particularly since the two tubular members are closer together than the concentric tubes in a standard 3-tube ICP torch. Furthermore the torch design in U.S. Pat. No. 4,833,294 has been developed to support a helium plasma at atmospheric pressure, and so the design is not useful for many ICP units which use argon plasmas.

The problem of reliably and reproducibly securing a highly concentric configuration of tubes (generally 3 tubes) in a demountable apparatus has previously been addressed. A review of prior art up to 1991 has been provided in U.S. Pat. No. 5,186,621 (filed Jul. 22, 1991). A discussion is provided of type I assemblies which rely on three compressed O-rings to define the concentric configuration (together with guide elements), and to inhibit gas leakage—a first compressed O-ring to provide a seal between the outer portion of the largest-diameter tube and the upper tube guide, a second compressed O-ring to provide a seal between the upper and lower tube guides, and a third compressed O-ring to provide a seal between the injector tube and the tube port in the lower tube guide. The O-rings are compressed by placing a shield over the tube/tube guide combination, affixing the shield to a base having a bore there-through, and screwing a compression plug forcibly into the base. The disadvantages of the above-described compressed O-ring system include:

The large number of required parts

The need to apply high pressure with the compression plug, which may cause breakage of a quartz tube or an injector tube The system is prone to O-ring failure, particularly failure arising from heat and UV radiation encountered when the torch is operational. O-ring failure leads to gas leakage and possibly arc formation or non-uniformity in sample flow The system often provides poor reproducibility between successive results.

In the same patent a discussion is provided of type II assemblies—these have a single blown quartz element that combines the coolant and plasma tubes, and a separate segmented attachment capable of accommodating injector tubes. Type II assemblies suffer from many of the shortcomings of type I assemblies. It is stated that leaks generally occur after one or two weeks of use due to heat and UV degradation of the injector tube O-ring. U.S. Pat. No. 5,186,621 goes on to describe a quartz element containing two outer tubes with gas entry ports (all fused together) and a superior double O-ring system for securing the sample tube. A compression plug is used to apply pressure to all sealing O-rings. However clearly the fused quartz element is a complex manufacture, and breakage or melting of any part of this element will entail its entire replacement.

U.S. Pat. No. 4,266,113 (filed Jul. 2, 1979) describes the use of spacer rings slip-fitted into the coolant and plasma passages of a plasma torch to provide support for the concentric arrangement and to also permit dismounting. Each ring is slotted to either direct coolant gas in a spiral flow pattern to improve its heat flow properties or to enhance the laminar character of the plasma gas flow. In a system of this kind, it is difficult to maintain the necessary tolerances for continued optimal function of the ICP torch particularly after multiple replacements of components.

U.S. Pat. No. 4,739,147 (filed Jan. 30, 1987) describes a plasma torch wherein the three tubes that are generally used in demountable plasma torches are joined together with taper joints. The axes of the taper joints are centrally aligned with the central long axis of the tubes so that the tubes are pre-aligned and concentric in the assembled torch. The assembly consists of only 3 parts. Such an arrangement must be fabricated by a glass-blower by welding together quartz components. It is very difficult to reproducibly provide an accurate location of all the tubes (including all future replacements) in order to achieve optimal operation of a plasma torch over an extended period.

The above discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of this application.

We have prepared demountable plasma torches comprising a base which is adapted to receive three tubular elements held in place by sliding friction. The sleeve which provides the precision engineered inner surface profile that can receive 3 tubes by sliding friction is expensive to make (often half or more of the cost of the complete torch is expended in the base component). Furthermore the fully assembled torch is somewhat bulky, and a special mounting bracket is required to connect the torch with standard argon ICP instruments.

There is a need to provide an ICP torch that matches the performance of the fused tube products but which can be readily disassembled for cleaning and replacement of components.

SUMMARY

The invention provides a plasma torch assembly comprising:
  a plurality of tubes;
  a collar integral with at least one tube comprising a first abutment surface;
  a base for holding the tubes during operation of the torch comprising a portion for receiving the collar and a second abutment surface for aligning the first abutment surface; and
  co-operating interlocking portions for removably urging the first and second abutment surfaces together by relative rotation of the interlocking portions wherein the first and second abutment surfaces comprise a complimentary taper for aligning the collar in concentric formation with at least one other tube on the base by co-operation of the interlocking portions.

In one embodiment the assembly comprises a plasma torch assembly as described above wherein the assembly comprises an annular member rotatable about the tube on the side of the collar remote from the base said rotatable member comprising an interlocking portion for co-acting with an interlocking portion on the base by relative rotation to urge the first abutment surface and second abutment surface together.

In another embodiment the base and collar comprise complementary interlocking portions for removably locking the at least one tube into concentric formation with at least one other tube on the base by relative rotation of the at least one tube and base.

In this other embodiment, the tube comprises an elongated tubular body and an interlocking portion integral with the tubular body. The term integral here refers to the interlocking portion being fixed to the tube body by bonding or being formed integrally with the tubular body. The term integral as used herein does not include a simple friction fit or slidable mounting about the tube. Indeed it is particularly preferred that the collar and base are relatively rigid so as to not undergo significant definition when the interlocking positions are interlocked.

The base portion of the plasma torch may be located at any orientation in space relative to the tubes during operation. For example, during operation the tubes may extend upward and have free ends above the base or the tubes may be oriented sideways or at an incline during operation. Nonetheless it is convenient to describe the plasma torch with reference to the orientation in which the base is oriented downward and the free (gas outlet) ends of the tubes are oriented upward. Except where otherwise indicated the description herein will refer to the torch with such an orientation and terms such as top, bottom, up, etc are used with reference to such orientation. It will be understood however that use of the torch is not limited to such an orientation and the invention relates to a torch which may be used in any convenient orientation.

The invention relates to the a plasma torch assembly which is adapted to be assembled and disassembled by virtue of complementary interlocking portions on the base and at least one tube. The complementary interlocking portions may be provided for locating one, two or three of the tubes and most preferably at least two tubes are provided with interlocking portions and the base comprises complementary interlocking portions for the at least two tubes.

In a preferred aspect the invention provides a plasma torch assembly comprising
  a plurality of tubes;
  a collar integral with at least one tube comprising a first abutment surface;
  a base for holding the tubes during operation of the torch comprising a portion for receiving the collar and a second abutment surface for aligning the first abutment surface to provide concentric alignment with at least one other tube on the base; and
  co-operating interlocking portions for removably urging the first and second abutment surfaces together by relative rotation of the interlocking portions wherein the first and second abutment surfaces comprise a complimentary taper for aligning the collar in concentric formation with at least one other tube on the base by co-operation of the interlocking portions.

In one embodiment the assembly comprises a plasma torch assembly as described above wherein the assembly comprises an annular member rotatable about the tube on the side of the collar remote from the base said rotatable member comprising an interlocking portion for co-acting with an interlocking portion on the base by relative rotation to urge the first abutment surface and second abutment surface together.

The assembly will preferably comprise a plurality of tubes including a coolant tube, a plasma tube which in use is disposed within the coolant tube and a sample tube which in use is disposed within the plasma tube. In the embodiment wherein the assembly is adapted to lock only one or two of the tubes to the base the other tube or tubes may be located within the base in an appropriate socket and may be integral with the base as a result of bonding with an adhesive or may be held by friction.

In a particularly preferred embodiment each of the sample tube and coolant tube comprise an interlocking portion and the base comprises complementary interlocking portions including an interlocking portion for co-acting with the interlocking portion of the coolant tube to lock it on the base concentrically about a plasma tube and an interlocking portion for co-acting with the a sample tube to lock the sample tube concentrically within a plasma tube. In this embodiment the plasma tube may be located within the base in a suitable friction fit and optionally bonded to the base.

Alternatively the plasma tube may be locked onto the base by complementary interlocking portions on the plasma tube and base. For example the base may comprise a series of coaxial bores including a relatively large diameter coolant tube bore and an interlocking portion for locking the coolant tube in the relatively large diameter bore; a bore for receiving a plasma tube of relatively smaller diameter compared with said relatively large diameter coolant tube bore and an interlocking portion for co-acting with an interlocking portion of the plasma tube to lock the plasma tube within the plasma tube bore and a bore for the sample of relatively smaller diameter compared with the plasma tube bore and an interlocking portion for co-acting with a complementary interlocking portion of a sample tube to lock the sample tube within the sample tube bore. The bores of relatively smaller diameter penetrate further into the base and the smallest bore (generally for the sample tube) may form a passage through which a tube may pass to allow it to be secured at the remote side of the base from the bores of larger diameter.

Preferably a tube (generally the plasma tube) is immobilised in a cavity within the base by use of adhesives or other immobilising means.

In a particularly preferred embodiment of the invention the base comprises an interlocking portion for co-acting with an interlocking portion of the sample tube and an interlocking portion for co-acting with an interlocking portion of the coolant tube. The interlocking portions of the base for co-acting with the coolant and sample tubes are most preferably each on opposite sides of the base. In this embodiment one of the tubes (preferably the sample tube) extends through a passage in the base to be locked onto a complementary interlocking portion on the side (typically the bottom side) of the base remote from the interlocking portion for the coolant tube (typically on the top of the base). The coolant tube and base interlocking portions cooperate to lock the coolant tube to the base with the coolant tube about and concentric with the plasma tube and the sample tube.

The interlocking portion of one or more of the plurality of tubes is typically adjacent the end of the tube remote from the gas outlet end of the tube.

The one or more tubes comprising an interlocking portion for co-acting with a complementary interlocking portion of the base may be locked into position on the base to provide a concentric arrangement of tubes by placing complementary interlocking portions of the at least one tube and base into contact with one another and providing relative axial rotation of the tube and base to provide locking of the tube in position on the base.

The interlocking portions of the base and tube may be provided by complementary male and female portions.

A range of co-acting interlocking portions may be used on the tube and base. Examples of suitable complementary interlocking portions on the tube and base may be selected from the group consisting of complementary male or female threaded portions, complementary portions of a bayonet connection and complementary portions of a luer lock connection. Complementary male and female threaded portions are most preferred.

The interlocking portions of the base and one or more tubes are preferably annular and may be continuous or discontinuous, for example in the form of circumferentially spaced protrusions on the tube, an annular flange, collar or shoulder about the tube.

When the complementary interlocking portions comprise male and female interlocking portions the interlocking portions preferably comprise stopping means. Examples of stopping mean include protrusions such as radial protrusions on at least one of the cooperating portions (optionally with a complementary socket on the other of the interlocking portions) and co-acting abutment surfaces.

The complementary interlocking portions preferably comprise abutment surfaces which co-act to stop relative travel of the interlocking portions to provide a locked position. Preferably at least one of the co-acting surfaces is tapered and abutment of the co-acting surfaces is adapted to provide alignment of the tubes in concentric formation. Most preferably the co-acting abutment surfaces comprise complementary tapered portions. The abutment surfaces may be annular or comprise a plurality of circumferentially spaced shoulder sections which co-act to provide a stop during locking of by relative rotation of the interlocking portions.

The interlocking portions may comprise a male interlocking portion extending from a surface on the base to be received in a complementary female interlocking portion about the body of the tube. Alternatively a male interlocking portion may be provided on the wall of the tube body to be received in a female interlocking portion of the base. The male interlocking portion may be provided by an annular shoulder or one or more circumferentially spaced projections or shoulders spaced about the tube body.

When the interlocking portions comprise complementary threaded portions it is preferred that the abutment surfaces are adjacent the threaded portions. Significant spacing of the threaded portions and abutment surfaces can lead to undue stresses being placed on the assembly.

In one embodiment the interlocking portion of the base comprises an axial internally threaded female portion and the complementary interlocking portion of the tube comprises an axial male threaded interlocking portion.

Where the interlocking portions comprise abutment surfaces and a thread the abutment surfaces may be outboard or inboard of the thread and may be inwardly or outwardly tapered toward the top of the base and tube body.

The base of the plasma assembly may comprise one component or a plurality of components interlocked. The base preferably has a cylindrical side and upper and lower sides (when the free ends of the tubes are oriented above the base). A passage preferably extends through the axis of the cylindrical base. Such a cylindrical block can readily be provided with a precision formed substantially circular and axially symmetric passage, for example by immobilising the cylinder on a mandrel which then rotates the block while cutting implements form the bore. The cylindrical block can also be reversed on the same mandrel so that the profile of the cavity can be developed by cutting from both ends of the block, while retaining a high degree of axial symmetry throughout the bore.

In one preferred embodiment the base comprises a larger diameter cavity in the upper port of the passage and within which the plasma tube is immobilised. This plasma tube cavity preferably extends to the upper side of the base (when the free ends of the tubes extend upward) and the interlocking portion for the coolant tube is in turn located outboard of the plasma tube cavity. In accordance with the above description the interlocking portion for the coolant tube may be a further cavity (or female interlocking portion) provided with a tapered portion in the form of an annular shoulder or alternatively may be in the form of an annular male interlocking portion. Preferably the site of immobilisation of the plasma tube is at least 0.5 cm below the upper surface of the base.

In a preferred embodiment the plasma torch assembly comprises:
 a coolant tube comprising a coolant tube body and an interlocking portion about the coolant tube body;
 a plasma tube for location concentrically within the coolant tube;
 a sample tube comprising a sample tube body and an interlocking portion about the sample tube body for location concentrically within the plasma tube;

a base comprising
   a passage extending there through;
   a cavity on the upper side of the base about the passage;
   at least two interlocking portions including an interlocking portion for co-acting with the interlocking portion of the sample tube on the lower side of the base and a interlocking portion for engaging the coolant tube on the upper side of the base;
wherein the plasma tube is immobilised within a cavity in the base; the sample tube interlocking portion and the interlocking portion on the lower side of the base comprise complementary tapered abutment and complementary threaded portions for interlocking the sample tube and base with the sample tube extending through the passage; and the coolant tube interlocking portion and interlocking portion on the upper side of the base comprise complementary tapered portions and threaded portions for locking the coolant tube on the base about the plasma tube.

At least one and preferably at least two of the tubes will comprise an integral collar providing a tapered portion and an interlocking portion which may be part of the integral color or may be provided by an annular rotatable portion adapted to engage and urge the collar onto the base preferably from the side of the collar remote from the base.

The base is preferably provided with a bore leading from the outside of the cylindrical side of the base to the internal space between the narrowest tube (sample tube) and the radially adjacent tube (plasma tube) for introducing plasma gas. This bore may be continuous with a spigot and may be used to introduce plasma gas to the torch to provide an annular gas stream between the sample tube and plasma tube which flows to the free ends of the tubes. Preferably this bore has an off-centre orientation within the internal space, which encourages plasma gas fed through the bore to swirl around the axis in the annular space between the two tubes.

In a preferred embodiment the base is provided with a bore for introducing a coolant gas leading from the outside of the body to the internal space between the middle tube (plasma tube) and the outer tube (coolant tube). The coolant gas bore may be continuous with a spigot and may be used to introduce coolant gas to the torch and provide a stream of gas flowing to the free ends of the tubes. Preferably the bore has an off-centre orientation within the internal space, which encourages coolant gas to swirl around the axis in the annular space between the two tubes.

The base is preferably formed of a machineable material or a mouldable material. The base may be constructed of a material selected from the group consisting of polypropylene, polyethylene, nylon, acetal polyphenylene sulphide, phenolic resin, polyethylene terephthalate, polyimide, polyetherimide, polyamide-imide, polyetheretherketone, polytetrafluoroethylene, polycarbonate, polyvinylchloride, polybenzimidazole, ceramic, mild steel, stainless steel, nickel and titanium.

The tube bodies are preferably formed of a chemically inert, heat resistant material such as quartz or ceramic. The interlocking portion of the tubes preferably comprises a machineable or mouldable material, preferably chosen from the same group of materials as the preferred group for the base.

The length of the assembly comprising the base with all tubular bodies attached may be in the range 100 mm to 180 mm. The outer diameter of the coolant tube (largest-diameter tube) is typically in the range 12 mm to 22 mm. The inner diameter of the coolant tube is typically in the range 10 mm to 18 mm.

In the most preferred embodiment interlocking portions of the tube and base comprise a male or a female threaded profile, comprising a one-start thread, a 2-start thread or a three-start thread, (more preferably a three-start thread).

One of the advantages of the plasma torch assembly of the invention is that it allows the number of components to be minimised and the o-rings and friction fitted components of the prior art to be dispensed with. Preferably the torch assembly of the invention is essentially free of o-ring and friction fitted components. More preferably the plasma torch assembly will consist essentially of a base, sample tube, plasma tube and coolant tube. Most preferably the plasma torch assembly will consist of three demountable parts; a base and a tube integral with the base forming one part and two demountable tubes forming the other parts. The demountable tubes are preferably the sample and coolant tube and the plasma tube is preferably fixed in the base to form an integral composite with the base.

BRIEF DESCRIPTION OF THE DRAWINGS

Specific embodiments of the invention will now be described with reference to the attached drawings. In the drawings:

FIG. 1c is the longitudinal view shown in FIG. 2b but in which the plasma torch assembly has been partly dismantled to more clearly show the location means of the plasma torch tubes and base.

FIG. 1d is a tool which may be used to disassemble the plasma torch of FIGS. 1a and 1c.

FIG. 5a is a view from below of a plasma torch assembly in accordance with a fifth embodiment of the invention.

FIG. 5b is a longitudinal section of the plasma torch assembly of FIG. 5a taken through the plan A-A and in which the torch has been dismantled.

DESCRIPTION OF PREFERRED EMBODIMENTS

Figures 1A, 1B:
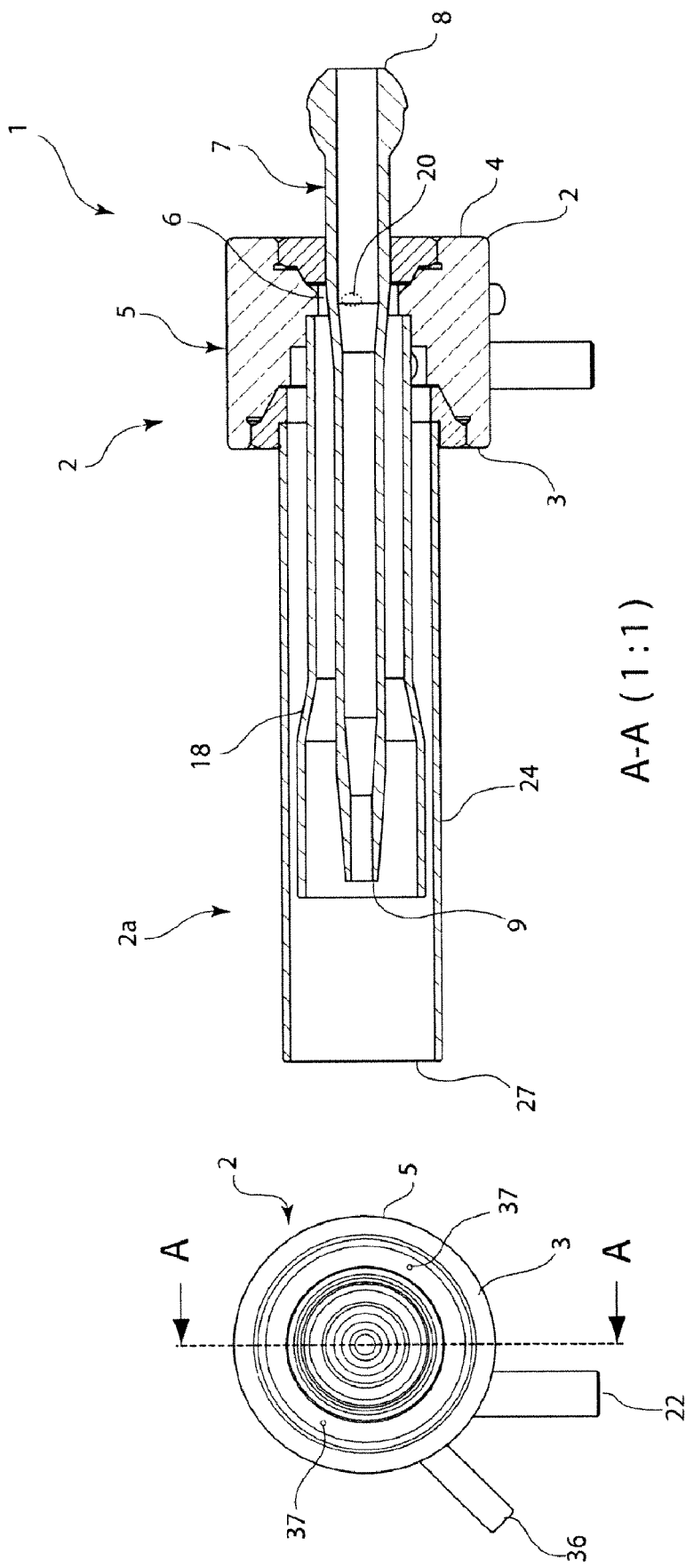
FIG. 1a is a view from the below of a plasma torch assembly in accordance with a first embodiment.
FIG. 1b is a longitudinal section of the plasma torch of FIG. 1a through the plane A-A.

Referring to FIGS. 1a to 1c there is shown an inductively coupled plasma torch (1) comprising a base (2) and concentric tubes (2a) retained on the base (2) during operation. The base comprises a top (3) (defined with reference to the tubes extending upwards); a bottom (4) and a cylindrical side (5). The concentric tubes include a sample tube (7) which comprises a tube body (10) of generally cylindrical form having an inlet end (8) for receiving a sample and an outlet end (9) for delivering the sample along the axis of the concentric assembly. A passage (6) extends through the axis of the base and a cylindrical sample tube body (10) comprising a sample tube inlet end (8) and a sample tube outlet end (9) extends through the passage (6). The sample tube (7) further comprises a locking portion (11) in the form of a collar about the cylindrical tube body (10). The tube interlocking portion (11) is adapted to interlock with a complementary interlocking portion (12) for the sample tube (7) on the base (2). The sample tube interlocking portion (11) is provided with a peripheral thread (13) which is received in a complementary threaded portion (14) of the base (2). The collar (11) provides a male threaded fitting (13) which is receivable within complementary female thread fitting (14) of the base (2). The sample tube interlocking portion (11) further comprises a sample tube abutment surface (15) which is narrowingly tapered toward the free end (9) of the tube body (10). A complementary abutment surface (16) on the base (2) provides a stop for the interlocking portion (11) of the sample tube (7) when the interlocking portion (11) of the sample tube (7) is locked by complementary threaded portions on the sample tube interlocking portion (11) and base (2) interlocking portion (12). Interaction of the abutment surfaces (15, 16) aid in ensuring alignment of the sample tube (7) in the concentric tube formation (2a). When locked in place the sample tube interlocking portion (11) may form an approximately co-planar surface with the bottom of the base (2).

The concentric tubes include a plasma tube (17) comprising a flared portion (18), a plasma tube inlet end (19) and a plasma tube outlet end (19a). Plasma tube inlet end is located in a socket (21) within the base (2). The passage (6) in the base (2) has a larger diameter than the sample tube thereby forming an annular chamber (23) which has an inlet port (20) for receiving plasma gas via a plasma gas inlet (22). The plasma tube (17) is fixed, for example with an adhesive, in a socket (21) in the base immediately downstream of the plasma gas chamber (23) formed by the passage (6).

The concentric tubes (2a) further include a coolant tube (24) comprising a coolant tube body (25) having a coolant tube inlet (26) and a coolant tube outlet end (27). The coolant tube further comprises a coolant tube interlocking portion (28) received in a complementary interlocking portion of the base (2) on the top side (3). The coolant tube interlocking portion (28) is located adjacent the inlet end of the coolant tube (26) and includes a threaded portion at the periphery (30) and an abutment surface (32) extending and narrowingly tapering toward the inlet end (26). The interlocking portion of the coolant tube (28) provides a male interlocking portion which is received in a complementary internal female interlocking portion of the base comprising a complementary peripheral threaded portion (31) and complementary abutment surface (33) for providing a locked position when the coolant tube interlocking portion (28) is engaged with the base to provide abutment of the complementary abutment surfaces (32, 33).

The base further comprises an annular coolant gas chamber (35) outboard of the plasma tube (17) comprising an inlet port (34) for a coolant gas received from a coolant gas spigot (36). When the coolant tube interlocking portion (28) is locked on the base with abutment surfaces (32, 33) adjacent one another the inlet (26) of the coolant tube (24) is immediately down stream of the coolant inlet chamber (35). The interlocking portion (28) of the coolant tube (24) may be adapted to lie approximately coplanar with the top (3) of the base (2) when the interlocking portion (28) is locked within the base (2).

The locking portions (11, 30) of the sample tube (7) and coolant tube (24) are locked each on opposite sides (3, 4) of the base (2). The interlocking portions (11, 28) of the sample tube (7) and coolant tube (24) may be provided with features such as pins or sockets (37) for engaging a tool such as shown in FIG. 1d having complementary fittings for rotating the interlocking portions (28) for removal and locking onto the base (2). The locating features (37) on the sample tube and/or coolant tube for engaging a rotational tool are preferably spaced apart, features selected from sockets and pins for engaging complementary pins or sockets (38) of a rotational tool (39). Alternatively, the interlocking portion may stand proud of the base to allow engagement of a spanner and/or comprise a cross section such as a hex cross section for engaging a conventional type spanner.

Figure 2B:
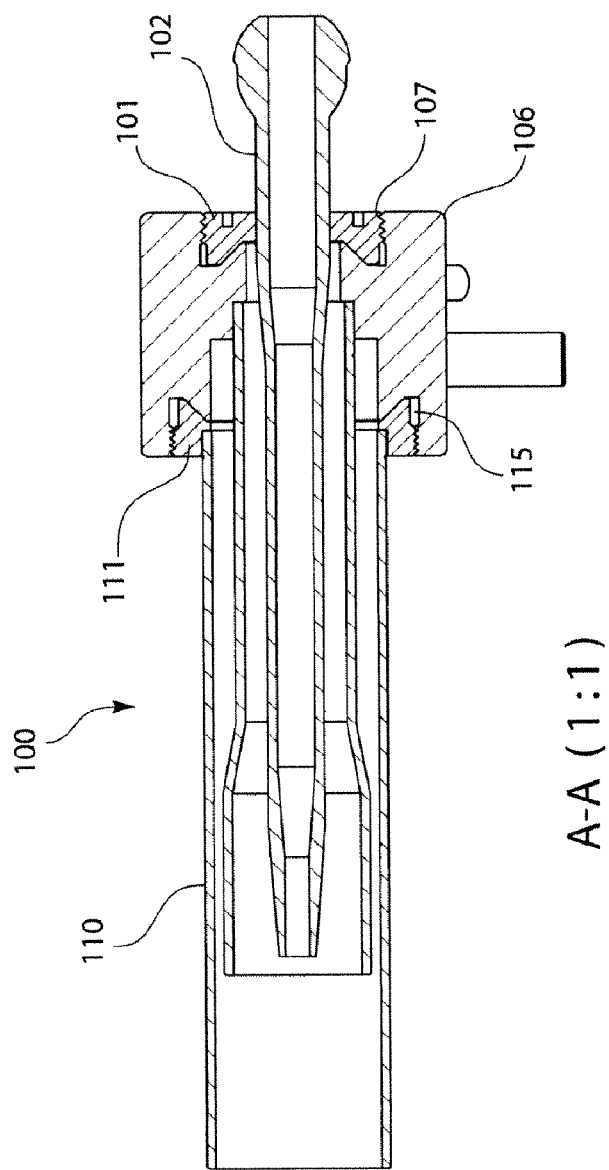
FIG. 2b is a longitudinal section of the plasma torch assembly of FIG. 2a taken through the plane A-A.
Figure 2A:
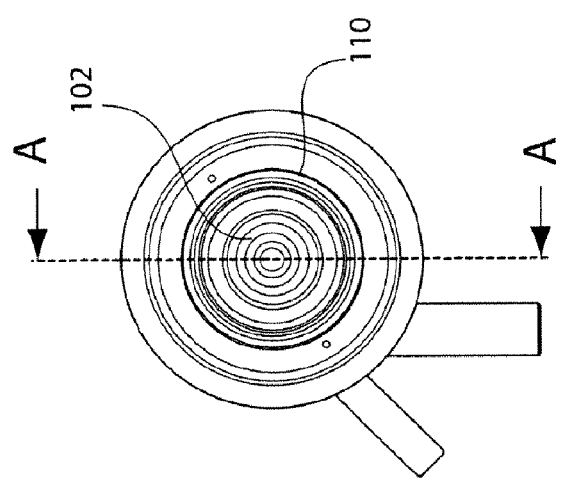
FIG. 2a is a view from below of a plasma torch assembly in accordance with a second embodiment of the invention.
Figure 2C:
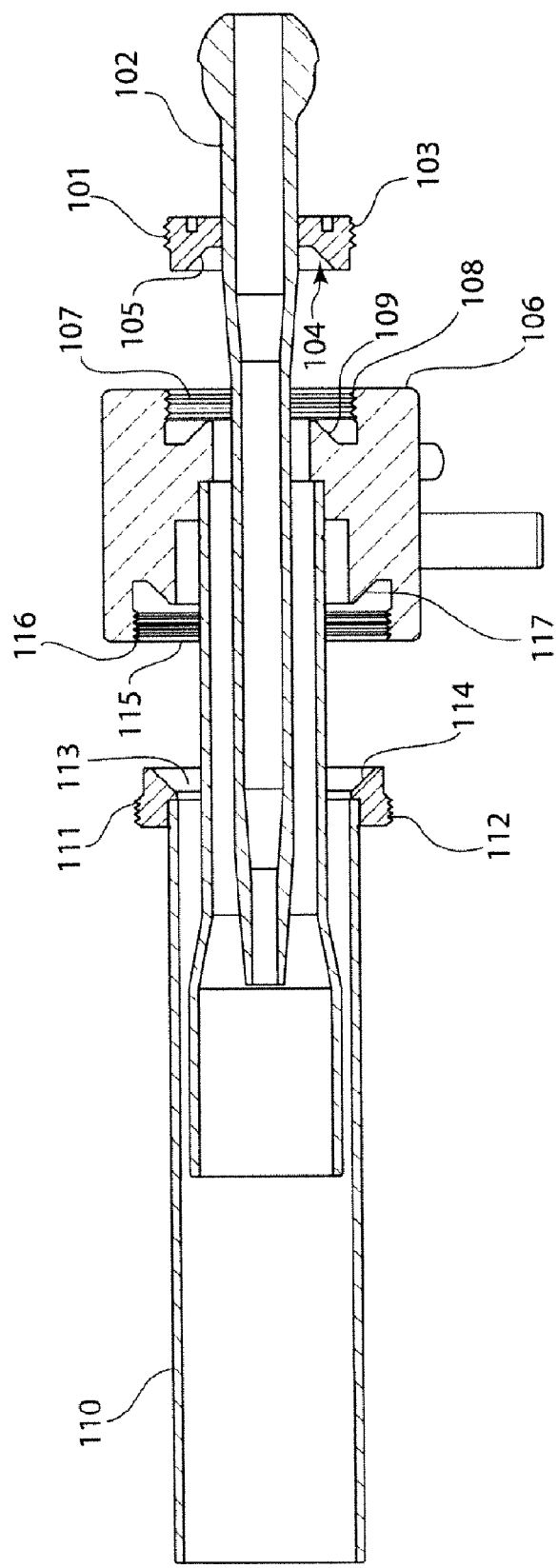
FIG. 2c is the longitudinal view shown in FIG. 2b but in which the plasma torch assembly has been partly dismantled to more clearly show the location means view of the plasma torch tubes and base.

Referring to FIGS. 2a to 2c there is shown a further embodiment of the plasma torch assembly of the invention (100) which is identical to the plasma torch assembly (1) of FIGS. 1a to 1c with the exception that an alternative arrangement is provided for the complementary interlocking portions (101, 107) of the sample tube (102) and base (106) and complementary interlocking portions (111, 115) of the coolant tube (110) and base (106).

In the embodiment shown in FIGS. 2a to 2c the interlocking portion (101) of the sample tube (102) is the form of an annular collar having a peripheral threaded portion (103) and a socket (104) comprising an annular abutment surface (105) which outwardly tapers toward the open end of the sample tube (102). The bottom of the base (106) comprises a female fitting (107) for receiving the sample tube interlocking portion (101). The base interlocking portion (107) comprises an internal threaded portion (108) for engaging the complementary threaded portion (103) of the sample tube interlocking portion (101). The interlocking portion (107) of the base (106) further includes an abutment surface (109) formed by an annular socket to provide the abutment surface (109) with a taper that narrows inwardly toward the bottom of the base (106). Similarly the coolant tube interlocking portion (111) comprises an annular threaded portion at its periphery (112) and a socket at the inlet end (113) of the coolant tube (110) which provides an annular internal abutment surface (114) which is outwardly tapered toward the gas inlet end of the coolant tube (110). The upper end of the base (106) comprises a complementary interlocking portion (115) in the form of a socket comprising an internal threaded portion (116) for engaging the complementary threaded portion (112) on the periphery of the coolant tube interlocking portion (111). The complementary interlocking portion (115) of the base (106) tapers inwardly toward the top end of the base to provide an annular abutment surface (117) for engaging the complementary abutment surface (114) of the interlocking portion (111).

Figures 3A, 3B:
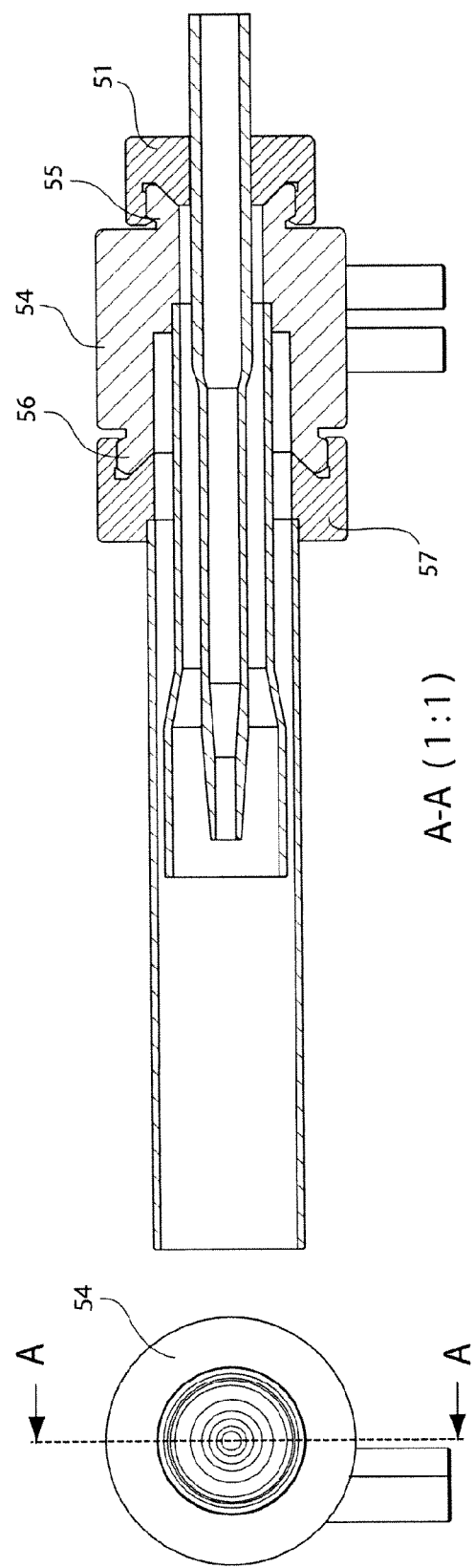
FIG. 3a is view from below of a plasma torch assembly in accordance with a third embodiment of the invention.
FIG. 3b is a longitudinal section of the plasma torch of FIG. 3a through the plane A-A.
Figure 3C:
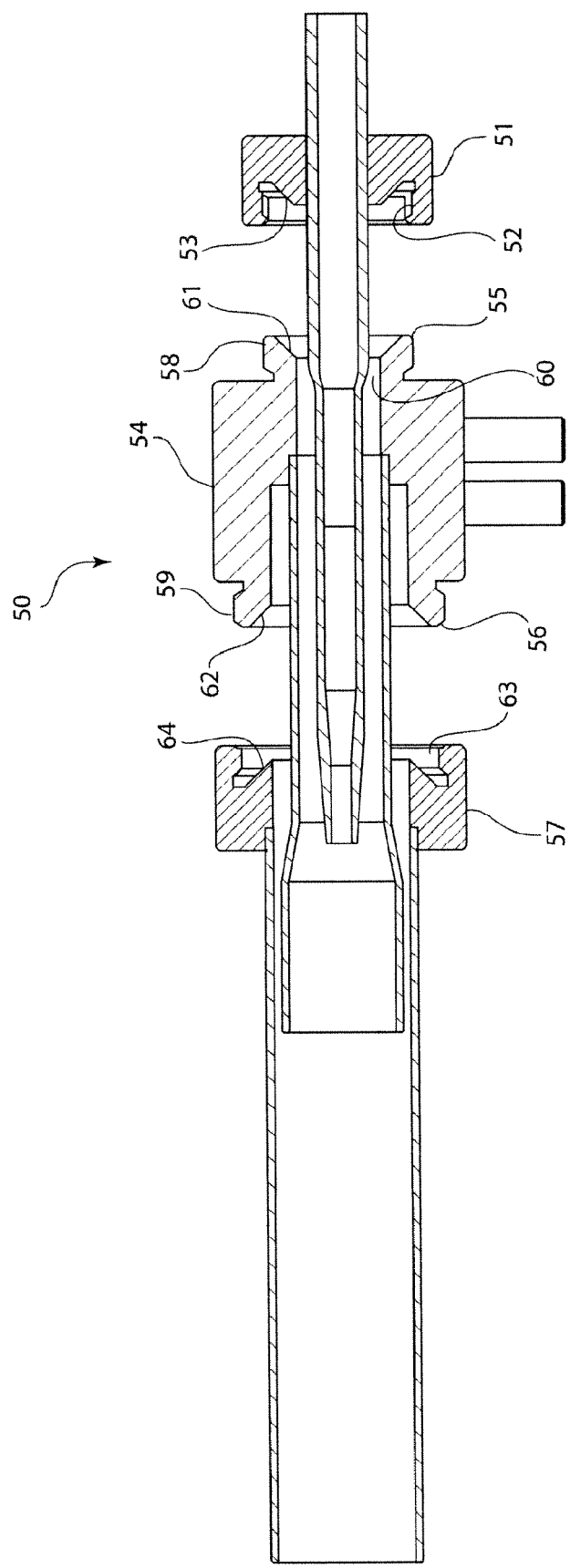
FIG. 3c is the longitudinal view shown in FIG. 3b but in which the plasma torch assembly has been partly dismantled to more clearly show the location means of the plasma torch tubes and base.

Referring to FIGS. 3a to 3c there is shown a further embodiment of the plasma torch assembly of the invention which is identical to the plasma torch assembly of FIGS. 1a to 1c with the exception that an alternative arrangement is provided for the complementary interlocking portions of the sample tube and base and the coolant tube and base. In the embodiment shown in FIGS. 3a to 3c the base (54) comprises male fittings (55, 56) for the corresponding female fittings provided by complementary sample tube interlocking portion (51) and coolant tube interlocking portion (57) respectively. The male fittings (55, 56) on the base (54) comprise an annular peripheral threaded portion (58, 59) and the internal base passage (60) has a position (61) which outwardly tapers toward the ends and has annular internal abutment surfaces (61, 62) which are outwardly tapered toward the ends of the base (54). The complementary interlocking portions (51, 57) of the sample and coolant tubes comprise female fittings having internal threaded portions (52, 63) and an abutment surface (53, 64) which are annular and narrowingly taper toward the base to engage the complementary abutment surfaces (61, 62) of the base (54).

Figures 4A, 4B:
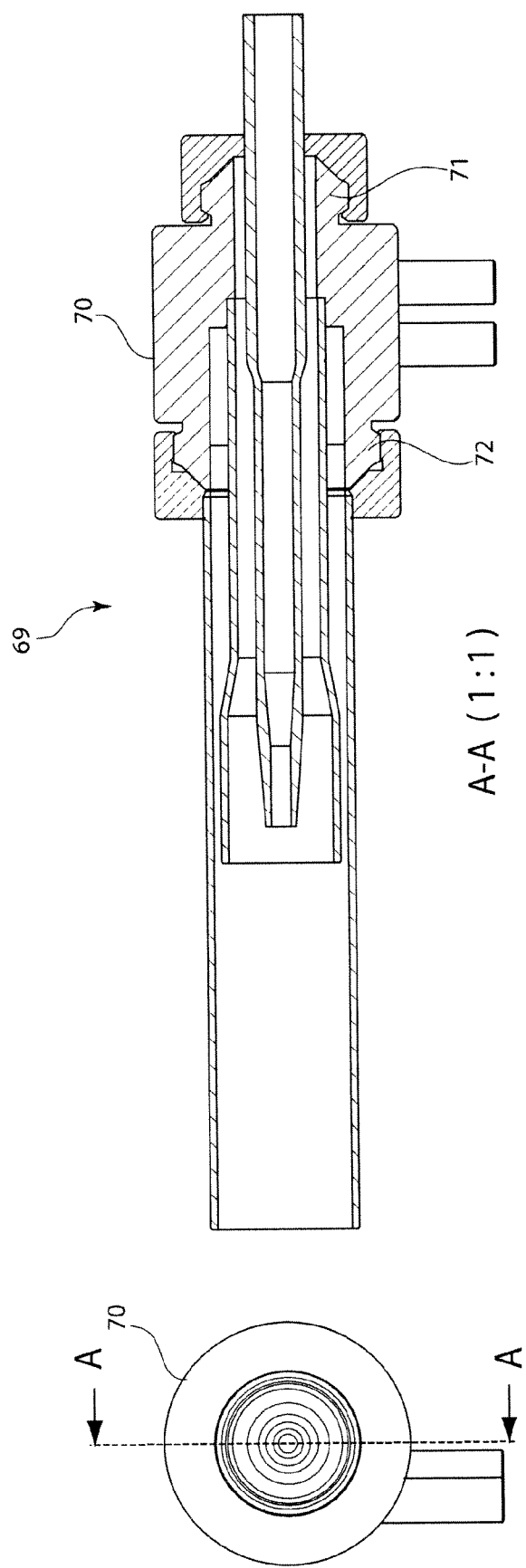
FIG. 4a is view from below of a plasma torch assembly in accordance with a fourth embodiment of the invention.
FIG. 4b is a longitudinal section of the plasma torch of FIG. 4a through the plane A-A.
Figure 4C:
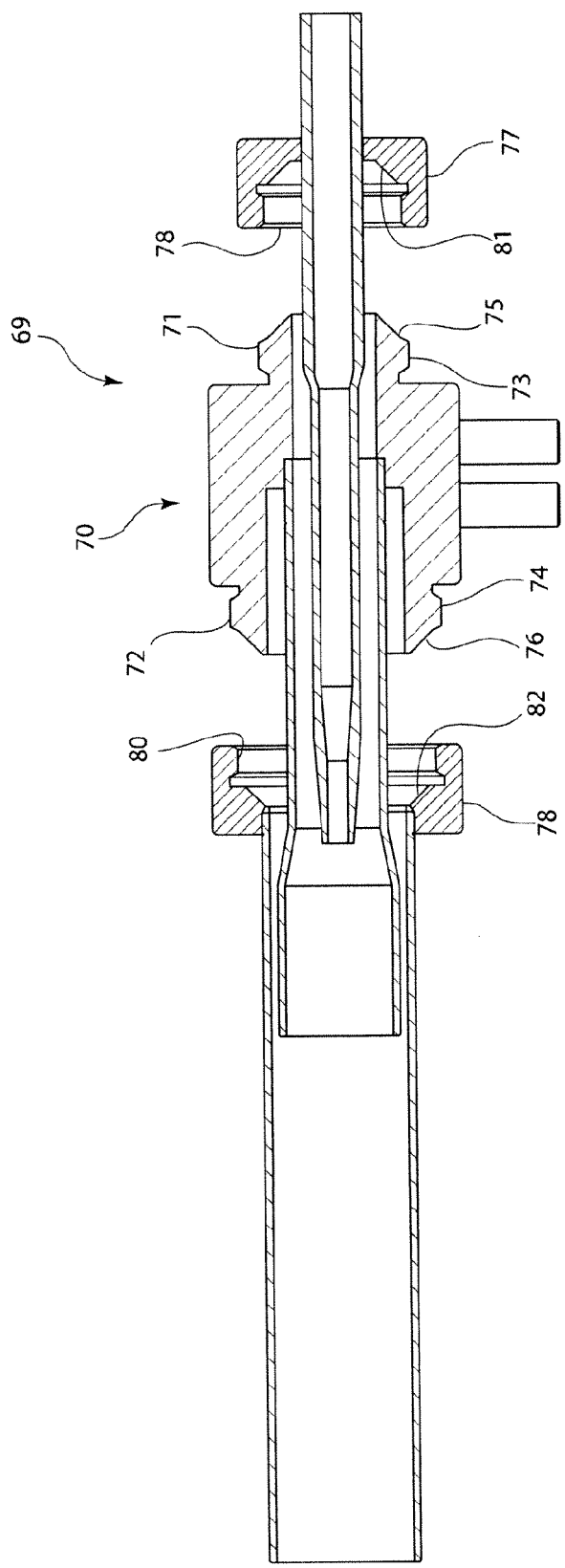
FIG. 4c is the longitudinal view shown in FIG. 4b but in which the plasma torch assembly has been partly dismantled to more clearly show the location means of the plasma torch tubes and base.

With reference to FIGS. 4a to 4c there is shown a plasma torch assembly (69) identical with the torch assembly of FIGS. 1a to 1c with the exception that the interlocking portions of the base and sample tube and base and coolant tube are differently configured. In the embodiment shown in FIGS. 4a to 4c the base (70) comprises male interlocking portions (71, 72) comprising peripheral threaded portions (73, 74) and narrowingly tapered abutment surfaces (75, 76) adjacent the ends of respective threaded portions (73, 74). Male interlocking portions (71, 72) of the base are removably lockable on female fittings provided by sample tube interlocking portion (77) and coolant tube interlocking portion (78). The female interlocking portions of sample tube interlocking portion and coolant tube interlocking portion (77, 78) comprise an internal peripheral thread (79, 80) and an adjacent inwardly tapered abutment surface (81, 82).

The plasma torch assembly of the invention may comprise a range of interlocking portions or combination thereof of the general type shown.

Figure 5C:
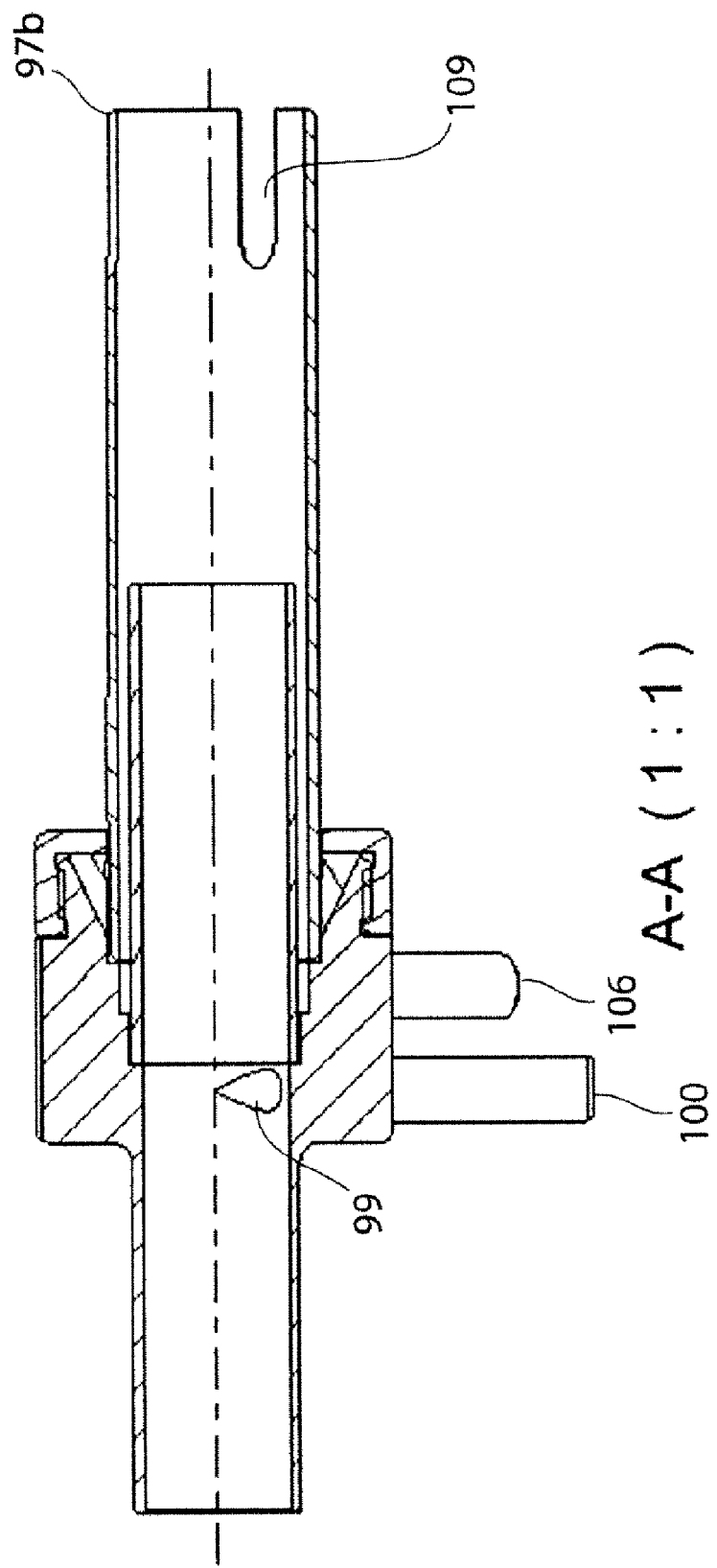
FIG. 5c is a longitudinal section of the plasma torch assembly of FIG. 5a which is assembled for use.

Referring to FIGS. 5a to 5c there is shown a plasma torch assembly (90) comprising a base (91) and a pair of concentric tubes (95, 96). The base comprises a top (92) (defined with reference to the tubes extending upward) and a bottom (93) and cylindrical side (94). A plasma tube (95) is fixed by adhesive at its inlet end (95a) in a socket (97) in the base (91) and extends from the top (92) of the base (91). The outlet (95b) extends away from the base (91). A sample for analysis may be injected by a sample tube (not shown) through the lumen (95c) of the plasma tube (95) and passage (98) which extends through the base (91). An inlet port (99) is provided in the base side (94) in a portion of the passage (98) upstream of the plasma tube inlet end (95a) for injecting plasma gas via plasma gas inlet conduit (100).

The coolant tube (96) comprises a coolant tube body (97) having an inlet end (97a) for receiving coolant gas and an outlet end (97b) extending away from the base (91).

The coolant tube has an integral collar (101) comprising an annular tapered surface (102) which narrows toward the inlet end (97a) of the coolant tube (96). The integral collar (101) is fixed by adhesive about the coolant tube body (97). The coolant tube collar (101) is received within a recess (103) in base (91) defined by annular internal wall (103a) which tapers outwardly and which conforms with the inward taper of the collar (101). The coolant tube (96) is further provided with an annular fastener (104) which is rotatable about the coolant tube body (97) and which, in operation, receives and extends about the collar (101). The base (91) and fastener (104) comprise coacting interlocking portions (107, 108) which by relative rotation urge the complementary tapered surfaces (102, 103a) of the collar (101) and base (91) into abutting relationship.

The base (91) further includes an annular chamber (105) upstream of the coolant inlet end (97a) of the coolant tube (96) (when said coolant tube is locked into the base) for receiving coolant gas from coolant gas inlet conduit (106). The annular fastener (104) and base upper end (92) preferably comprise coacting male and female threaded portions (107, 108) for removably urging the collar into alignment with the plasma tube (95) by cooperation of the tapered abutment surfaces (102, 103a) and locking it on the base.

The coolant tube has a slot (109) extending from the outlet end (97b) which allows viewing of operation of the apparatus. The viewing slot (109) may be oriented in a fixed orientation with respect to the base (91) during fastening of the tube onto the base by rotation of the fastener (104) independently of the coolant tube body (97).

Figure 6A:
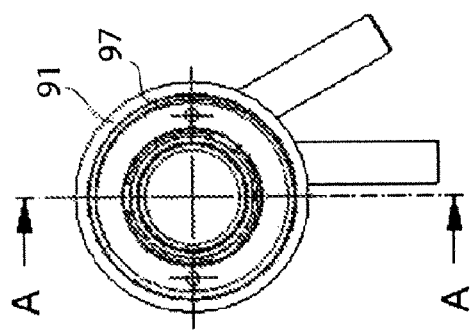
FIG. 6a is a view from below of a plasma torch assembly in accordance with the sixth embodiment of the invention.
Figure 6B:
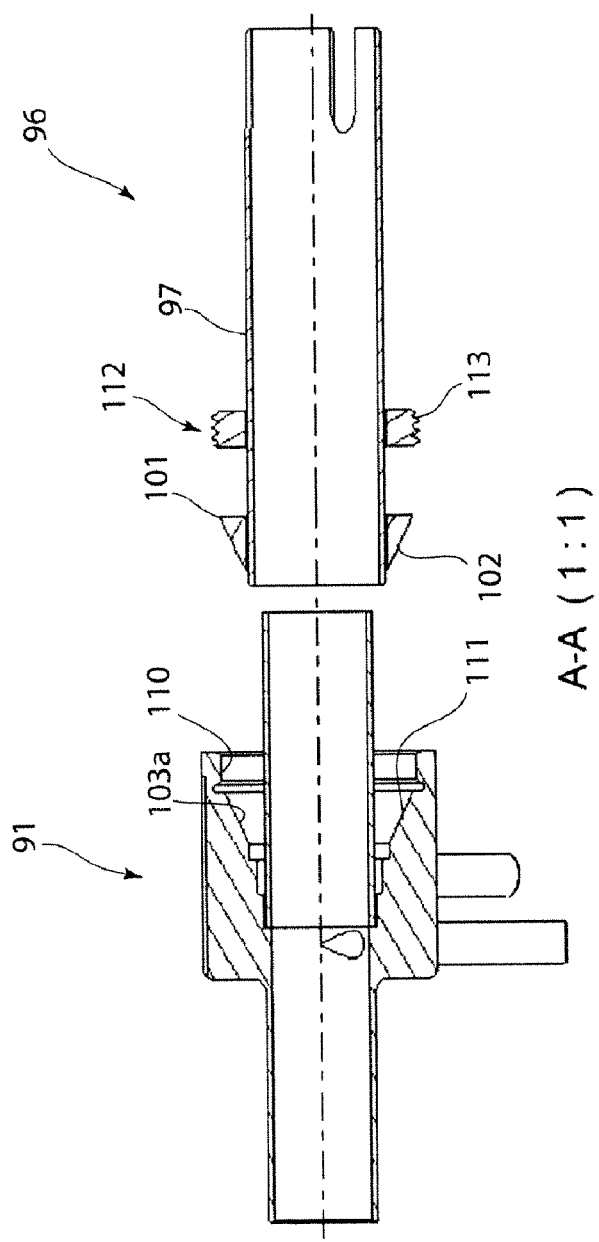
FIG. 6b is a longitudinal section of the plasma torch assembly of FIG. 6a taken through the plane A-A and in which the torch is dismantled.
Figure 6C:
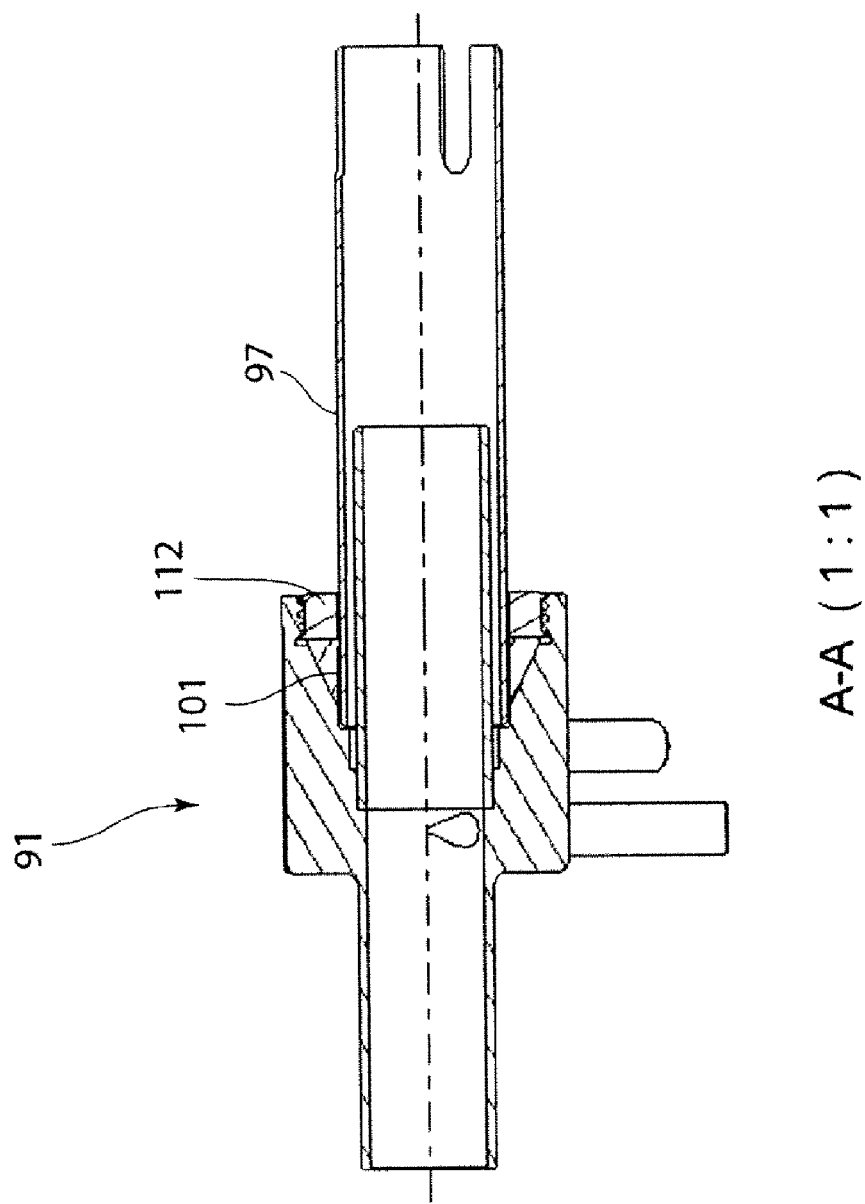
FIG. 6c is a longitudinal section of the plasma torch assembly of FIG. 6a which is assembled for use.

In the embodiment shown in FIGS. 6a to 6c the plasma tube is identical to that shown in 5a to 5c except for the interlocking portions (107, 108) of the base (91) and fastener (104). Whereas in FIGS. 5a to 5c the base comprises a male threaded portion (108) and the tube fastener comprises a female threaded portion (107) the corresponding portions in FIGS. 6a to 6c include a base (91) having an internal female (110) thread adjacent to the tapered portion (111) and the coolant tube (96) is provided with an annular fastener (112) rotatable about the coolant tube body (97) having a peripheral male threaded portion (113) which cooperates with the female threaded portion 110 of the base to urge together the tapered surfaces (102, 103a) of collar (101) and base (91).

Figure 7A:
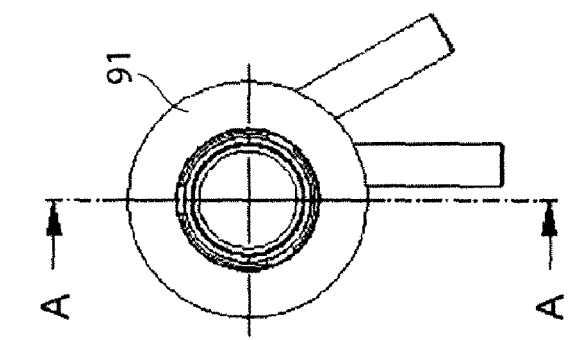
FIG. 7a is a view from below of a plasma torch assembly in accordance with a seventh embodiment of the invention.
Figure 7B:
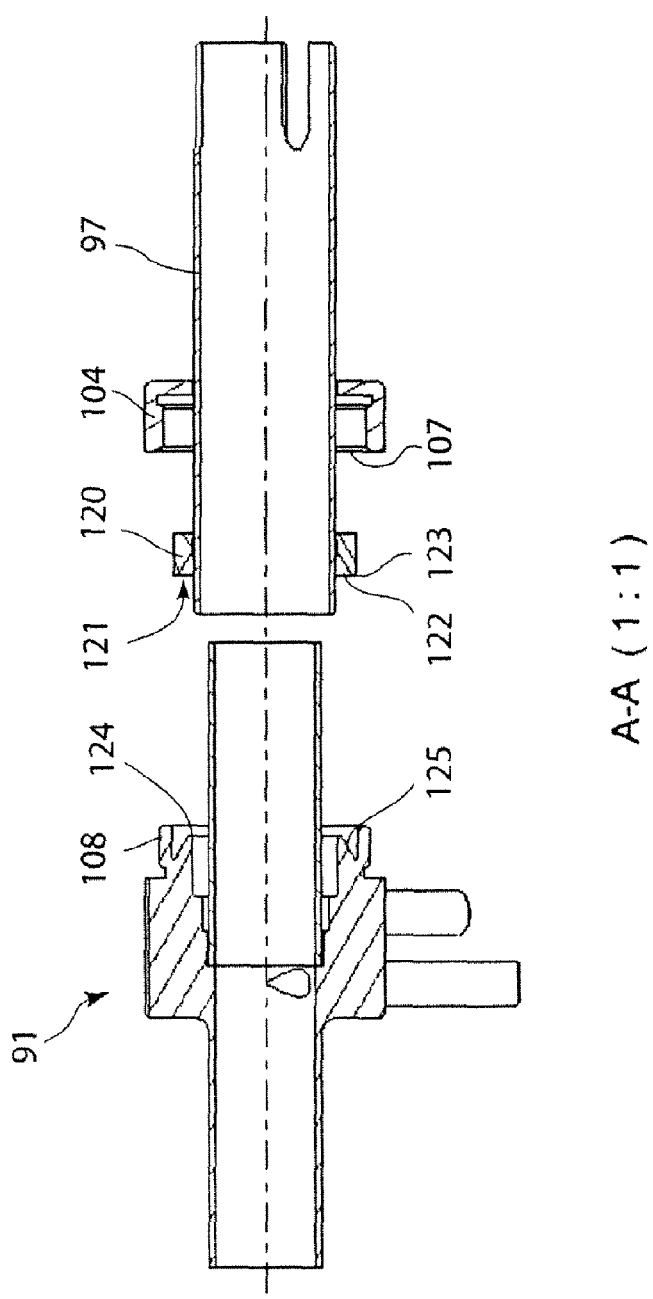
FIG. 7b is a longitudinal section of the plasma torch assembly of FIG. 7a taken through the plane A-A and in which the torch is disassembled.
Figure 7C:
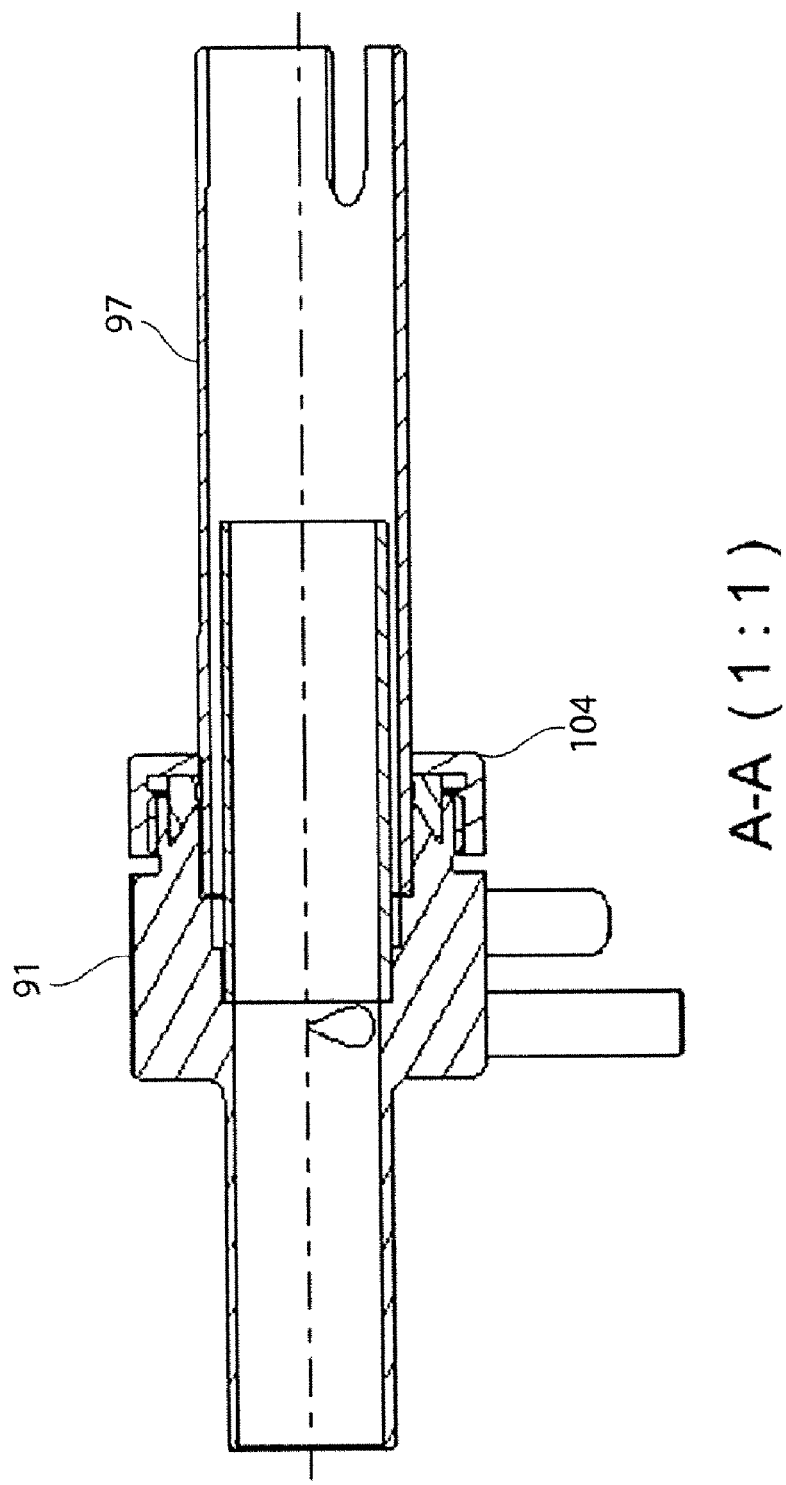
FIG. 7c is a longitudinal section of the plasma torch assembly of FIG. 7a which is assembled for use.

FIGS. 7a to 7c show a plasma tube assembly which is identical to that in FIGS. 5a to 5c except that the coolant tube collar (120) comprises an annular recess (121) at the end (123) facing the base (91) which recess is defined by a wall inwardly tapering toward the end (97b) of the coolant tube (96). The base upper end (92) comprises a projection (124) having an outer surface (125) which narrowingly tapers toward the top end (92) for abutment with the tapered recess surface (122) of the collar (120). The fastener (104) comprising the female threaded portion (107) engages the base male threaded portion (108) to urge the abutment surfaces (122, 125) together.

Finally, it is understood that various other modifications and/or alterations may be made without departing from the spirit of the present invention as outlined herein.

The invention claimed is:

1. An inductively coupled plasma torch assembly comprising:
   a coolant tube comprising a coolant gas inlet end, a coolant gas outlet end and a collar bonded to or integrally formed with the coolant tube, said collar adjacent the coolant gas inlet end comprising a first tapered abutment surface;
   a plasma tube comprising a plasma gas inlet end and a plasma gas outlet end, disposed concentrically within the coolant tube;
   a sample tube disposed concentrically within the plasma tube; and a base for retaining the coolant and plasma tubes, having a top, a bottom and side defined with reference to the coolant and plasma tubes extending upward from the top of the base, the base comprising:

a socket within which the plasma tube is fixed at the plasma gas inlet end thereof;

a second tapered abutment surface in the top of base; and a passage through the base defined by a lumen for locating the sample tube concentrically within the plasma tube; and wherein the first tapered abutment surface of the collar and the second tapered abutment surface of the base have complementary tapers which cooperate to locate the coolant tube concentrically about the plasma tube; and wherein the inductively coupled plasma torch assembly further comprises interlocking portions which co-act to urge the first and second abutment surfaces together, said interlocking portions comprising a base interlocking portion on the top side of the base and a coolant tube interlocking portion which is either (a) part of the collar, or (b) provided by an annular member rotatable about the coolant tube on a side of the collar remote from the base and adapted to engage the remote side of the collar and urge the collar onto the base.

2. An inductively coupled plasma torch assembly according to claim 1, wherein the first tapered abutment surface is annular and narrowingly tapers toward the coolant gas inlet, and the second tapered abutment surface comprises a recess in the top of the base defined by an annular internal wall which tapers outwardly toward the top of the base.

3. An inductively coupled plasma torch assembly according to claim 1, wherein the first tapered abutment surface comprises an annular recess at the coolant gas inlet end of the collar which narrowingly tapers in the direction of the gas outlet end, and the top of the base comprises a projection having an outer surface which provides a second annular abutment surface which narrowingly tapers toward the top end of the projection.

4. A plasma torch assembly according to claim 1, wherein the cooling tube interlocking portions comprises the annular member.

5. A plasma torch assembly according to claim 1, wherein the collar and base are rigid and do not deform when the interlocking portions are interlocked.

6. A plasma torch assembly according to claim 1, wherein each of the sample tube and coolant tube are provided with an interlocking portion, and the base comprises complementary interlocking portions including an interlocking portion for co-acting with the interlocking portion of the coolant tube to lock it on the base concentrically about the plasma tube and an interlocking portion for co-acting with the interlocking portion of the sample tube to lock the sample tube concentrically within the plasma tube.

7. A plasma torch assembly according to claim 1, wherein the plasma tube is bonded to the base in the socket in the base.

8. A plasma torch assembly according to claim 1, wherein the complementary interlocking portions on the base and the coolant tube are selected from the group consisting of complementary male or female threaded portions complementary portions, of a bayonet connection, and complementary portions of a luer lock connection.

9. A plasma torch assembly according to claim 8, wherein the interlocking portions of the coolant tube and base have complementary male and female threaded portion.

10. A plasma torch assembly according to claim 1, wherein the interlocking portions of the base and the coolant tube are annular.

11. A plasma torch assembly according to claim 1, being free of O-ring and friction fitted components.

12. A plasma torch assembly according to claim 1, wherein the plasma tube, the sample tube and the coolant tube are rotatably demountable from the base.

13. A plasma torch assembly according to claim 1, wherein the base is constructed of a material selected from the group consisting of polypropylene, polyethylene, nylon, acetal polyphenylene sulphide, phenolic resin, polyethylene terephthalate, polyimide, polyetherimide, polyamide-imide, polyetheretherketone, polytetrafluoroethylene, polycarbonate, polyvinylchloride, polybenzimidazole, ceramic, mild steel, stainless steel, nickel and titanium.

14. A plasma torch assembly according to claim 1, wherein the complementary interlocking portions comprise a threaded portion of the collar and a threaded portion of the base which co-acts with the threaded portion of the collar to urge the first and second abutment surfaces together.

* * * * *

UNITED STATES PATENT AND TRADEMARK OFFICE
CERTIFICATE OF CORRECTION

Page 1 of 1

PATENT NO.      : 8,232,500 B2
APPLICATION NO. : 12/942314
DATED           : July 31, 2012
INVENTOR(S)     : Brezni et al.

It is certified that error appears in the above-identified patent and that said Letters Patent is hereby corrected as shown below:

Col. 13, line 40, claim 4:

"comprises" should be -- comprise --

Col. 14, line 15, claim 8:

add ‚ after "portions"

Col. 14, line 20, claim 9:

"portion" should be -- portions --

Signed and Sealed this
Second Day of October, 2012

David J. Kappos
*Director of the United States Patent and Trademark Office*